US007461009B1

(12) United States Patent
Haulk et al.

(10) Patent No.: US 7,461,009 B1
(45) Date of Patent: Dec. 2, 2008

(54) SYSTEM AND METHOD OF SENDING MESSAGES TO ELECTRONIC SHELF LABELS BASED UPON PRIORITY

(75) Inventors: Kevin W. Haulk, Griffin, GA (US); Cheryl K. Harkins, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 748 days.

(21) Appl. No.: 09/896,317

(22) Filed: Jun. 29, 2001

(51) Int. Cl.
*G06Q 40/00* (2006.01)

(52) U.S. Cl. .............................. 705/20; 705/21; 705/27; 705/16; 235/383

(58) Field of Classification Search .................. 705/20, 705/21, 22, 16, 23, 27; 235/383
See application file for complete search history.

(56) References Cited

U.S. PATENT DOCUMENTS

| | | | | |
|---|---|---|---|---|
| 3,925,766 | A | | 12/1975 | Bardotti et al ............ 340/172.5 |
| 5,172,314 | A | | 12/1992 | Poland et al. ................ 364/401 |
| 5,179,708 | A | * | 1/1993 | Gyllstrom et al. ............ 719/314 |
| 5,285,792 | A | | 2/1994 | Sjoquist et al. .............. 128/697 |
| 5,377,354 | A | | 12/1994 | Scannell et al. .............. 395/650 |
| 5,506,966 | A | | 4/1996 | Ban ............................ 395/250 |
| 5,632,010 | A | * | 5/1997 | Briechle et al. .............. 345/1.1 |
| 5,797,132 | A | * | 8/1998 | Altwasser ..................... 705/16 |
| 5,870,714 | A | * | 2/1999 | Shetty et al. ................... 705/20 |
| 5,940,390 | A | | 8/1999 | Berl et al. .................... 370/389 |
| 5,974,414 | A | | 10/1999 | Stanczak et al. ................ 707/6 |
| 5,983,265 | A | | 11/1999 | Martino, II ................... 709/206 |
| 6,018,515 | A | | 1/2000 | Sorber ......................... 370/229 |
| 6,021,395 | A | * | 2/2000 | Goodwin, III ................. 705/20 |
| 6,101,545 | A | | 8/2000 | Balcerowski et al. ........ 709/230 |
| 6,108,367 | A | * | 8/2000 | Herman et al. ............... 375/141 |
| 6,115,365 | A | | 9/2000 | Newberg et al. ............. 370/312 |
| 6,147,592 | A | | 11/2000 | Ulrich et al. ............ 340/286.07 |
| 6,437,893 | B1 | * | 8/2002 | Rivollet et al. ............... 398/153 |
| 6,442,531 | B1 | * | 8/2002 | Goodwin, III ................. 705/20 |
| 2002/0002421 | A1 | * | 1/2002 | Murofushi ................... 700/214 |

OTHER PUBLICATIONS

Chain Store Age Executive with Shopping Center Age, v70, n8, p. 38, Aug. 1994., "Trying again, with less hype: electronic making efforts continue".*
"Supermarket go high tech with electronic shelf labels" by Rice Electronic Business vol. 14, No. 17,, pp. 16-36; Sep. 1, 1988.*
"Fiesta Mart to test radio shelf labeling" Zimmerman Supermarket News, v45, n6, p. 9; Feb. 6, 1995.*
"Shelf labels go electronic . . . "; Fensholt Supermarket Business, v43, n5, p. 46 May 1988.*

* cited by examiner

*Primary Examiner*—Hani Kazimi
(74) *Attorney, Agent, or Firm*—Paul W. Martin

(57) ABSTRACT

An electronic shelf label system which sends messages to electronic shelf labels based upon priority. The system includes an electronic shelf label, and a computer for assigning a priority to an unsent message to the electronic shelf label, for comparing the priority to other priorities of other messages which are unsent, and for sending the message if the priority is higher than the other priorities. The computer may also determine message priorities of types of messages.

8 Claims, 4 Drawing Sheets

SYSTEM AND METHOD OF SENDING MESSAGES TO ELECTRONIC SHELF LABELS BASED UPON PRIORITY

BACKGROUND OF THE INVENTION

The present invention relates to electronic shelf label (ESL) systems, and more specifically to a system and method of sending messages to ESLs based upon priority.

ESL systems typically include a plurality of ESLs for merchandise items in a transaction establishment. ESLs typically display the price of corresponding merchandise items on store shelves and are typically attached to a rail along the leading edge of the shelves. A transaction establishment may contain thousands of ESLs to display the prices of the merchandise items. The ESLs are coupled to a central server from where information about the ESLs is typically maintained in an ESL database or data file. Price information displayed by the ESLs is obtained from a price look-up (PLU) data file and stored within an ESL price change record.

ESL systems may use a spool file to queue messages for transmission. Messages typically contain updated information for display by the ESLs. Messages are sent sequentially as they appear in the spool file. A disadvantage to this approach is that important messages are not sent in a timely fashion. The situation is further aggravated if the spool file contains many more messages of relative unimportance than messages of high importance. Also, if additional types of messages besides those containing updated information are spooled as well, the more important update messages are delayed even more.

Therefore, it would be desirable to provide a system and method of sending messages to ESLs based upon priority.

SUMMARY OF THE INVENTION

In accordance with the teachings of the present invention, a system and method of sending messages to electronic price labels (ESLs) based upon priority is provided.

The system includes an electronic shelf label, and a computer for assigning a priority to an unsent message to the electronic shelf label, for comparing the priority to other priorities of other messages which are unsent, and for sending the message if the priority is higher than the other priorities. The computer may also determine message priorities of types of messages.

The method includes the steps of assigning a priority to the message, comparing the priority to other priorities of other messages which are unsent, and sending the message if the priority is higher than the other priorities.

It is accordingly an object of the present invention to provide a system and method of sending messages to ESLs based upon priority.

It is another object of the present invention to assign priority information to messages to be sent to ESLs.

It is another object of the present invention to assign priority information to types of messages to be sent to ESLs.

It is another object of the present invention to track priority information in messages to be sent to ESLs.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
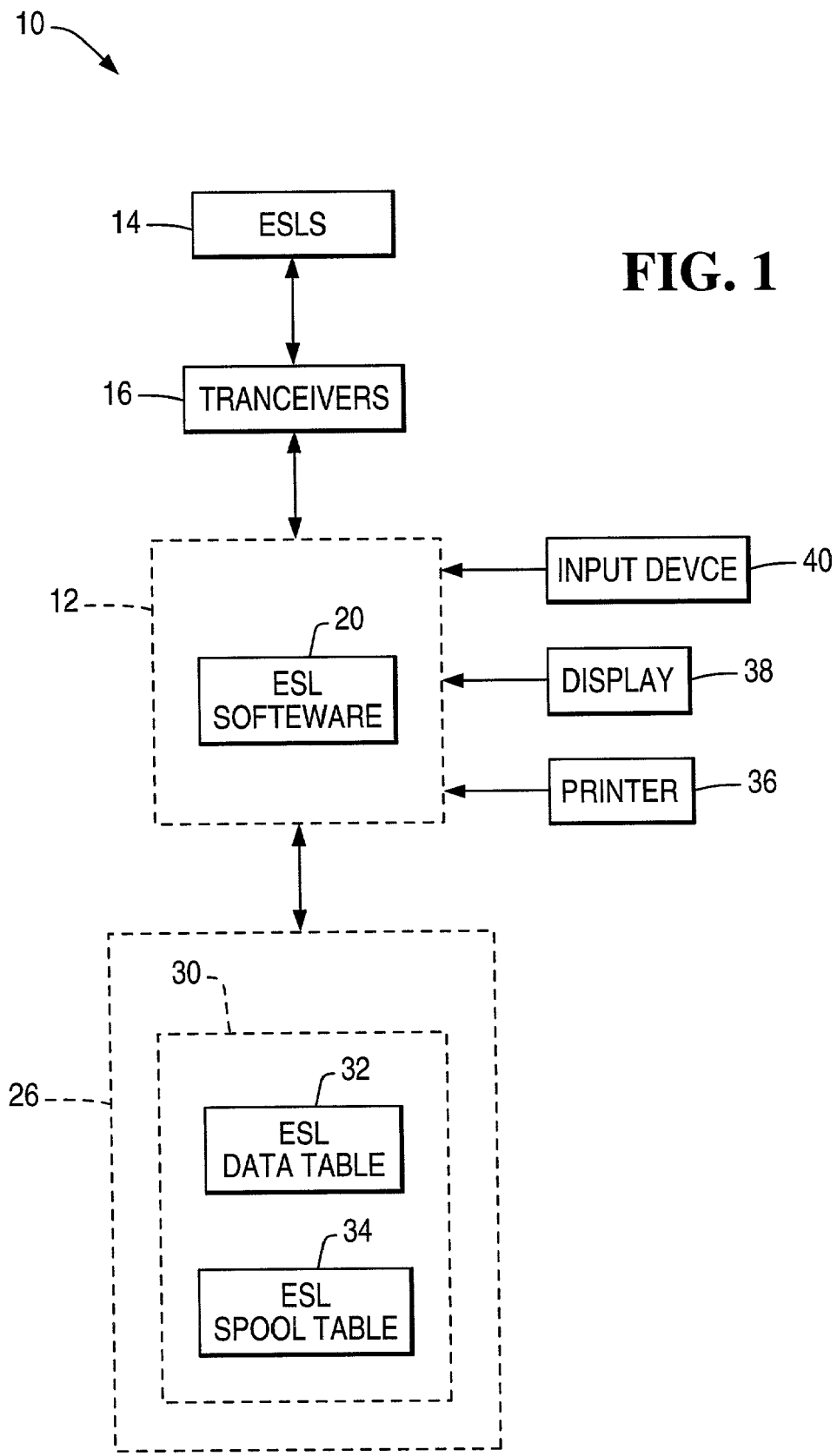
FIG. 1 is a block diagram of an electronic price label system.

Referring now to FIG. 1, ESL system 10 primarily includes host computer system 12 and ESLs 14.

ESLs 14 display price and other data, such as promotional data.

Host computer system 12 executes ESL software 20, which is responsible for scheduling and transmitting messages containing commands and/or data, such as price and promotional data, to ESLs 14.

ESL software 20 maintains ESL database 30, which includes data table 32 and spool table 34. In addition to other data, data table 32 contains ESL assignments, including ESL identification information and corresponding item identification information.

Spool table 34 contains messages to be sent to ESLs 14. Spool table 34 may contain more than one record for any given ESL 14.

An operator may add messages to spool table 34 in batch, or one at a time using input device 40. ESL software 20 provides the operator with information or reports through display 38 or printer 36.

Alternatively, separate data files may be used instead of tables 32 and 34 in database 30.

To assist with execution of certain tasks performed by ESL software 20, host computer system 12 includes a built-in time keeping device, commonly referred to as a system clock, which is synchronized with current time, in order to automatically execute the tasks at their scheduled times. One task managed by ESL computer system 12 is the transmission of messages to ESLs 14 at scheduled times.

ESL storage medium 26 stores ESL database 30. ESL storage medium 26 is preferably a fixed disk drive.

ESL system 10 may be a wired or wireless system or a combination of both.

Figure 2:
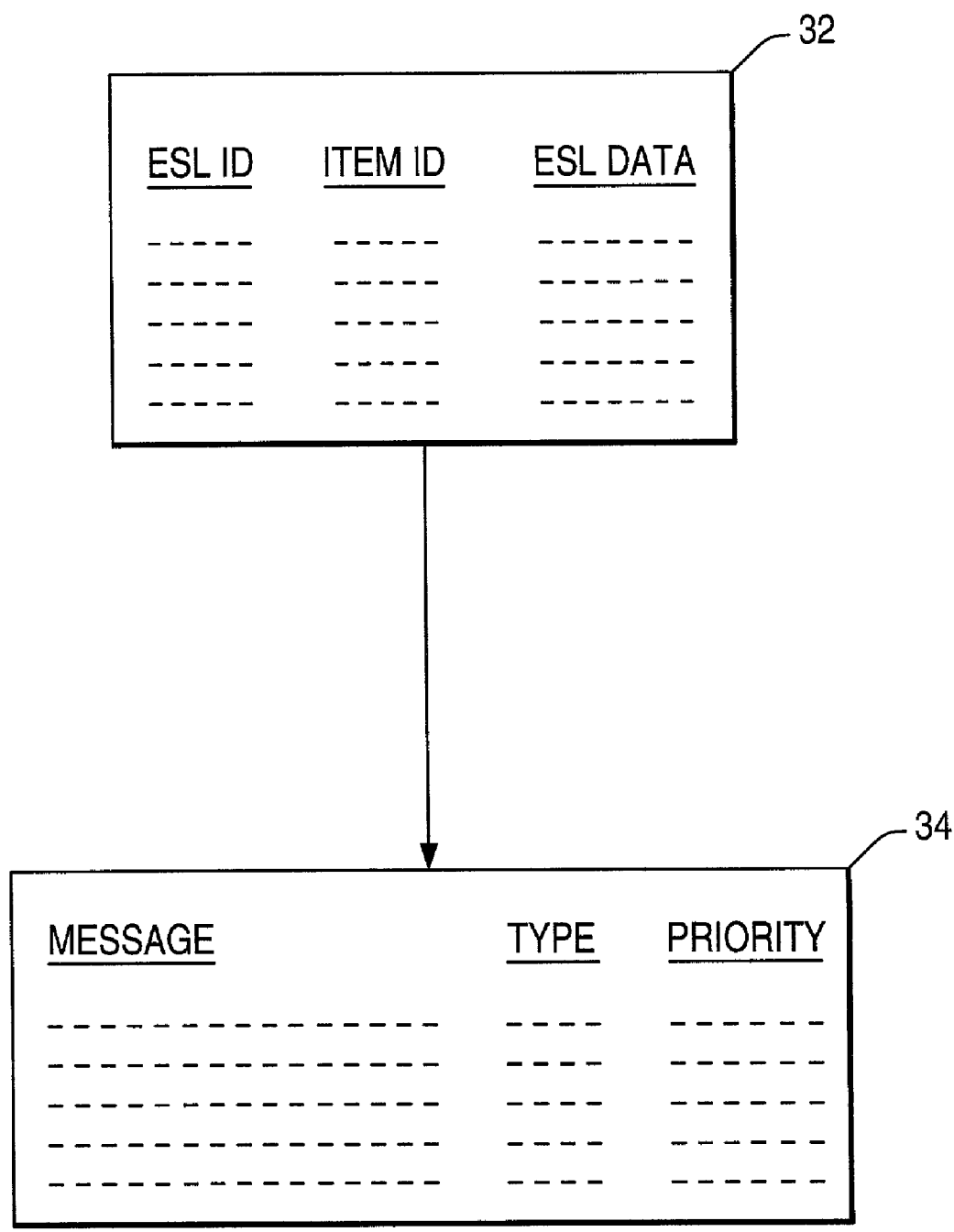
FIG. 2 is a diagram showing two tables used within a transaction establishment.

Turning now to FIG. 2, ESL data table 32 and ESL spool table 34 are shown in more detail.

In addition to other information, ESL data table 32 may include a line entry for each ESL 14 in ESL system 10. Each line entry has an ESL identification entry (ESL ID), an item identification entry (ITEM ID), and may additionally include a current display data entry (ESL DATA).

Entry ESL ID identifies an ESL and may include a serial number.

Entry ITEM ID identifies a store item associated with the ESL.

Entry ESL DATA is a full image of all representable data currently being displayed by ESL 14.

In addition to other information, ESL spool table 34 includes line entries for each message. Each line entry to record has a message entry (MESSAGE) and may also have a message type entry (TYPE) and/or a message priority entry (PRIORITY).

Entry MESSAGE includes information about a message to be sent.

Entry MESSAGE may include an ESL identification number. ESL spool table 34 may include multiple spool table entries for any given ESL 14. Also, entry MESSAGE may identify a broadcast message to a group of ESLs 14, which is not associated with a single ESL 14.

Entry MESSAGE may identify display data to be sent. ESL software 20 obtains any display information to be sent as part of a message from another table in ESL database 30 or another file.

Entry TYPE identifies the type of message. For example, one type of message could be an "update" message which contains new information for display. Another example message could be a "bedcheck" message which queries ESLs 14 for status information. Types may be processed sequentially or in accordance with their own assigned priorities.

Entry PRIORITY identifies the priority of the message over other messages in ESL spool table 34. Example priorities may be 1 through 10, with 1 being the highest priority. A default priority may be assigned and used when no priority entry is present.

During normal operation, ESL software 20 identifies all entries PRIORITY and sends messages with corresponding content in order of priority. ESL software 20 may also identify message types from entries TYPE and rank order messages within each type by priority. Message types may themselves be ordered in fixed priorities for transmission.

Figure 3:
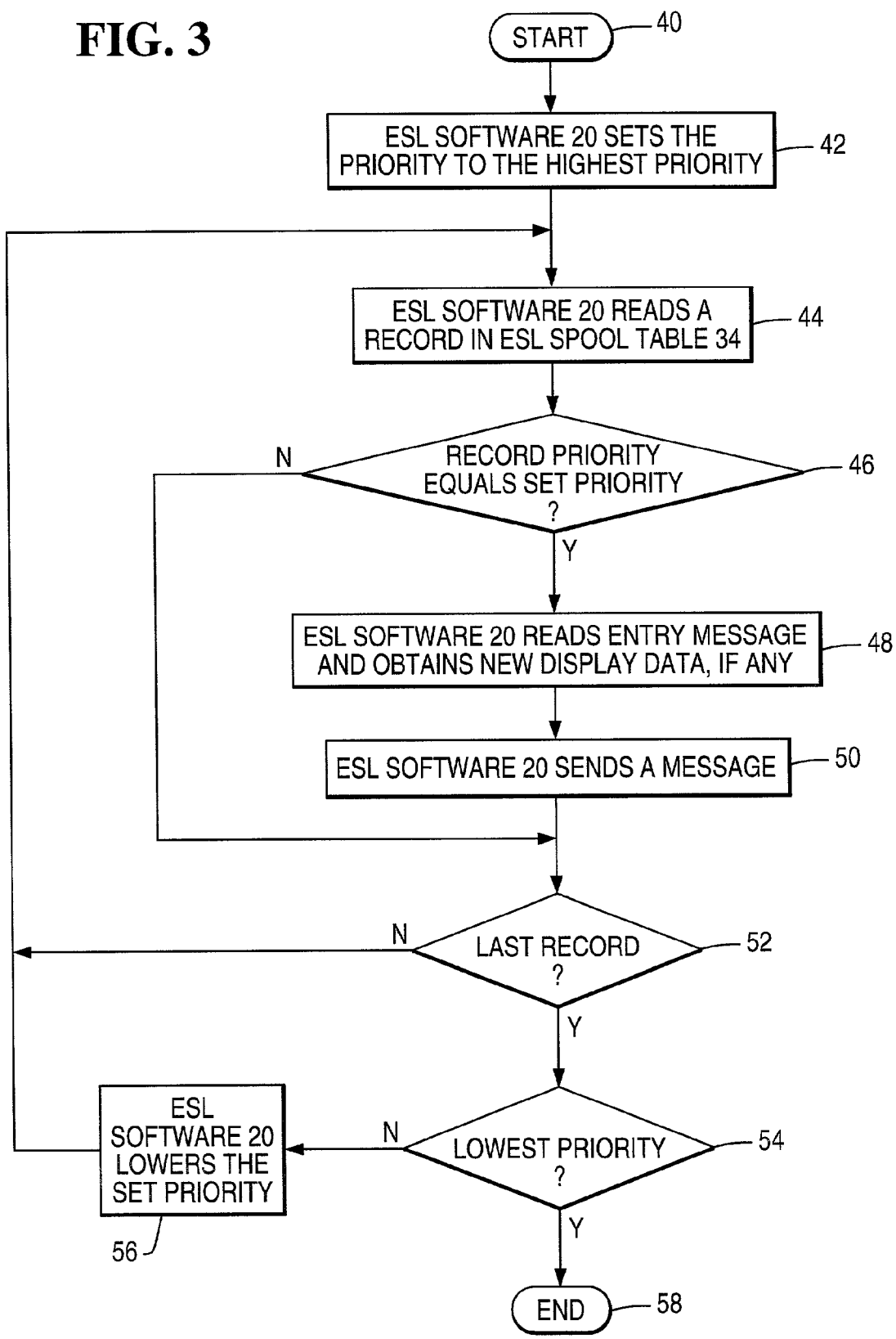
FIG. 3 is a flow diagram illustrating a first software operation.

Turning now to FIG. 3, operation of ESL software 20 is illustrated in more detail beginning with START 50. The method of FIG. 3 focuses on priority.

In step 52, ESL software 20 sets the priority to the highest priority.

In step 54, ESL software 20 reads a record in ESL spool table 34.

In step 56, ESL software 20 determines whether entry PRIORITY is equal to the set priority. If so, operation proceeds to step 58. Otherwise, operation proceeds to step 52.

In step 58, ESL software 20 reads entry MESSAGE and obtains associated new display data, if any.

In step 60, ESL software 20 sends a message in accordance with information in entry MESSAGE.

In step 62, ESL software 20 determines whether the record is the last record. If not, operation returns to step 54. Otherwise, operation proceeds to step 64.

In step 64, ESL software 20 determines whether the priority is the lowest priority. If not, operation proceeds to step 66. Otherwise, operation proceeds to step 68.

In step 66, ESL software 20 sets a next lower priority and operation returns to step 52.

In step 68, operation ends.

Figure 4:
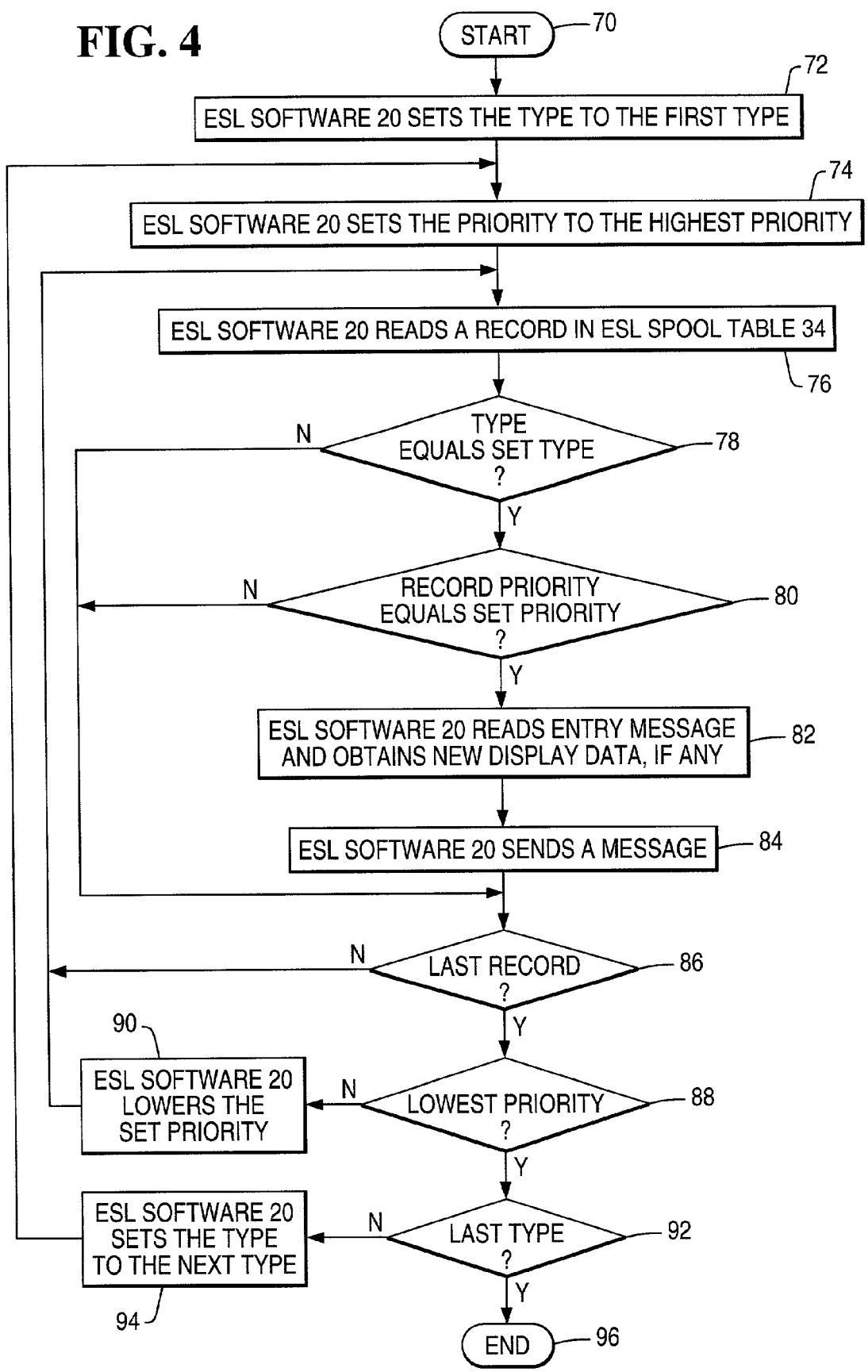
FIG. 4 is a flow diagram illustrating a second software operation.

Turning now to FIG. 4, operation of ESL software 20 is illustrated in more detail beginning with START 70. The method of FIG. 4 focuses on priority and type.

In step 72, ESL software 20 sets the type to the first type, whether it be by priority or some other determinant.

In step 74, ESL software 20 sets the priority to the highest priority.

In step 76, ESL software 20 reads a record in ESL spool table 34.

In step 78, ESL software 20 determines whether entry TYPE is equal to the set type. If so, operation proceeds to step 80. Otherwise, operation proceeds to step 86.

In step 80, ESL software 20 determines whether entry PRIORITY is equal to the set priority. If so, operation proceeds to step 82. Otherwise, operation proceeds to step 86.

In step 82, ESL software 20 reads entry MESSAGE and obtains associated new display data, if any.

In step 84, ESL software 20 sends a message in accordance with information in entry MESSAGE.

In step 86, ESL software 20 determines whether the record is the last record. If not, operation returns to step 76. Otherwise, operation proceeds to step 88.

In step 88, ESL software 20 determines whether the set priority is the lowest priority. If not, operation proceeds to step 90. Otherwise, operation proceeds to step 92.

In step 90, ESL software 20 sets a next lower priority and operation returns to step 76.

In step 92, ESL software 20 determines whether the type is the last type. If not, operation proceeds to step 94. Otherwise, operation proceeds to step 96.

In step 94, ESL software 20 sets a next type and operation returns to step 74.

In step 96, operation ends.

Although the present invention has been described with particular reference to certain preferred embodiments thereof, variations and modifications of the present invention can be effected within the spirit and scope of the following claims.

We claim:

1. A method of sending a message to an electronic shelf label comprising the steps of:
    placing the message in a spool file containing other messages to be sent to other electronic shelf labels;
    assigning a transmission priority to the message relative to other transmission priorities assigned to the other messages; and
    sending the message including
        comparing the transmission priority to the other transmission priorities of the other messages; and
        sending the message after higher priority messages have been sent.

2. A method of sending messages to a plurality of electronic shelf labels comprising the steps of:
    placing the messages to the plurality of electronic shelf labels in a spool file;
    assigning transmission priorities to the messages; and
    sending the messages in order of transmission priority starting with a highest priority message.

3. A method of sending messages to a plurality of electronic shelf labels comprising the steps of:
    placing the messages to the plurality of electronic shelf labels in a spool file;
    determining possible transmission priorities;
    assigning a number of actual transmission priorities out of the possible transmission priorities to the messages; and
    sending the messages in order of actual transmission priority starting with a highest actual priority message.

4. A method of sending a message to an electronic shelf label comprising the steps of:
    placing the message in a spool file containing other messages to be sent to other electronic shelf labels;
    assigning a type to the message;
    assigning a transmission priority to the message relative to other transmission priorities assigned to the other messages; and
    sending the message including
        comparing the transmission priority to the other transmission priorities of same type messages of the other messages; and
        sending the message after higher priority same type messages have been sent.

5. A method of sending messages to electronic shelf labels comprising the steps of:
- placing the messages to the plurality of electronic shelf labels in a spool file;
- assigning types to the messages;
- assigning transmission priorities to the messages; and
- sending the messages including
  - ordering the messages by type and transmission priority; and
  - sending the messages in each type in order of transmission priority, starting with a highest priority message in each type.

6. An electronic shelf label system comprising:
- a plurality of electronic shelf labels; and
- a computer for placing messages to the plurality of electronic shelf labels in a spool file, for determining possible transmission priorities, for assigning a number of actual transmission priorities out of the possible transmission priorities to the messages, and for sending the messages in order of actual transmission priority starting with a highest actual priority message.

7. An electronic shelf label system comprising:
- a plurality of electronic shelf labels; and
- a computer for placing messages to the plurality of electronic shelf labels in a spool file, for assigning transmission priorities to the messages, and for sending the messages in order of transmission priority starting with a highest priority message.

8. An electronic shelf label system comprising:
- a plurality of electronic shelf labels; and
- a computer for placing messages to the plurality of electronic shelf labels in a spool file, for assigning types to the messages, for assigning transmission priorities to the messages, and for sending the messages including ordering the messages by type and transmission priority and sending the messages in each type in order of transmission priority, starting with a highest priority message in each type.

* * * * *